(12) United States Patent
    Kitazawa

(10) Patent No.: US 11,120,231 B2
(45) Date of Patent: Sep. 14, 2021

(54) CARD READER AND CARD READER CONTROL METHOD

(71) Applicant: NIDEC SANKYO CORPORATION, Nagano (JP)

(72) Inventor: Yasuhiro Kitazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/560,195

(22) Filed: Sep. 4, 2019

(65) Prior Publication Data

US 2020/0082132 A1    Mar. 12, 2020

(30) Foreign Application Priority Data

Sep. 7, 2018  (JP) .............................. JP2018-167684

(51) Int. Cl.
    *G06K 7/00*    (2006.01)
(52) U.S. Cl.
    CPC .................. *G06K 7/0004* (2013.01)
(58) Field of Classification Search
    CPC ............ G06K 7/00; G06K 7/08; G06K 7/082; G06K 7/0004
    USPC ................ 235/440, 380, 492, 439, 435, 375
    See application file for complete search history.

(56) References Cited

U.S. PATENT DOCUMENTS

| 9,286,494 | B1* | 3/2016 | Lamfalusi | .......... | G06K 13/0875 |
| 2004/0089723 | A1* | 5/2004 | Moriya | .................. | G06K 13/08 |
| | | | | | 235/475 |
| 2010/0170949 | A1* | 7/2010 | Ishikawa | ............ | G06K 13/0875 |
| | | | | | 235/439 |
| 2011/0241287 | A1* | 10/2011 | Nireki | .................... | G06K 13/16 |
| | | | | | 271/207 |

FOREIGN PATENT DOCUMENTS

JP          H11203417 A      7/1999

* cited by examiner

*Primary Examiner* — Edwyn Labaze
(74) *Attorney, Agent, or Firm* — Cantor Colburn LLP

(57) ABSTRACT

A card reader for use with a card having an integrated circuit (IC) chip may include a magnetic head configured to read magnetic data on the card; an IC sensor configured to read and write IC data from and to the IC chip on the card; a magnetic data discrimination unit configured to determine the presence of the magnetic data on the card according to whether or not the magnetic data has been read by the magnetic head when the inserted card has been transported to a rear side from a leading end up to a predetermined position; and an IC reading controller configured to, if the magnetic data discrimination unit determines that the magnetic data is not present on the card, perform control to transport the card to a front side and control the IC sensor to read the IC data on the IC chip.

12 Claims, 5 Drawing Sheets

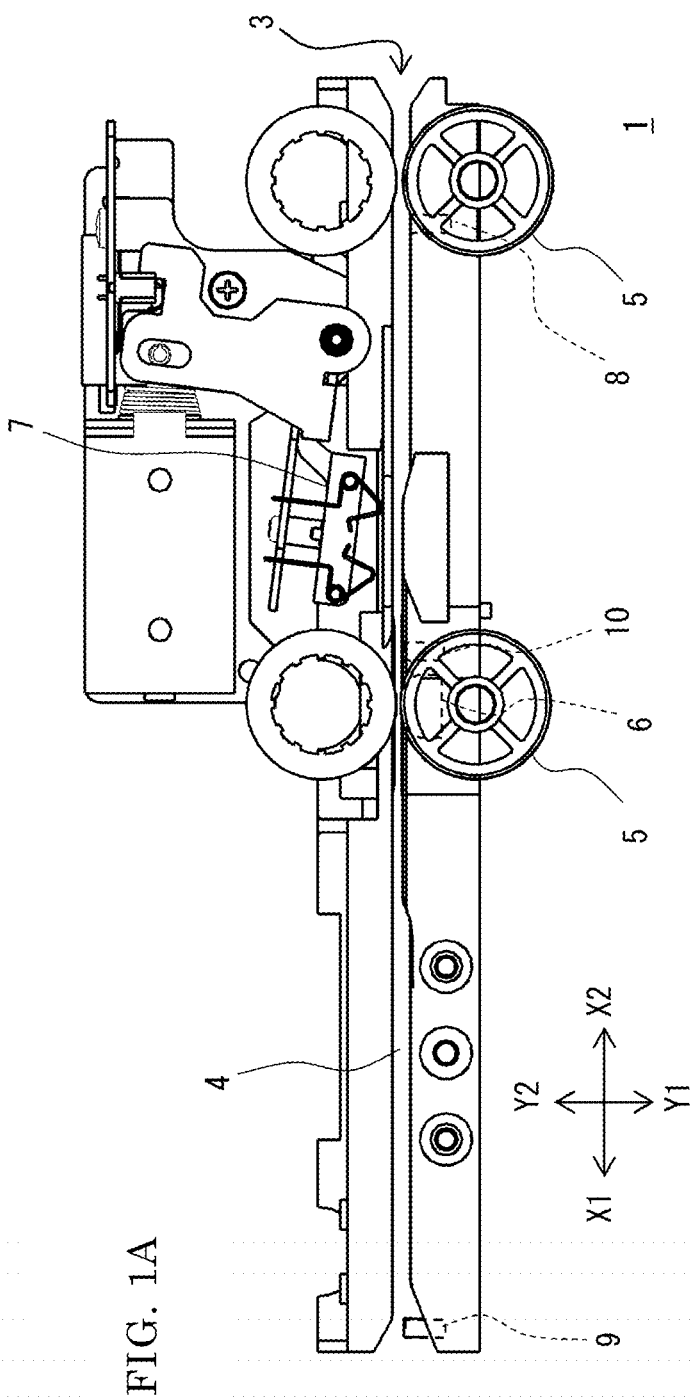
FIG. 1A
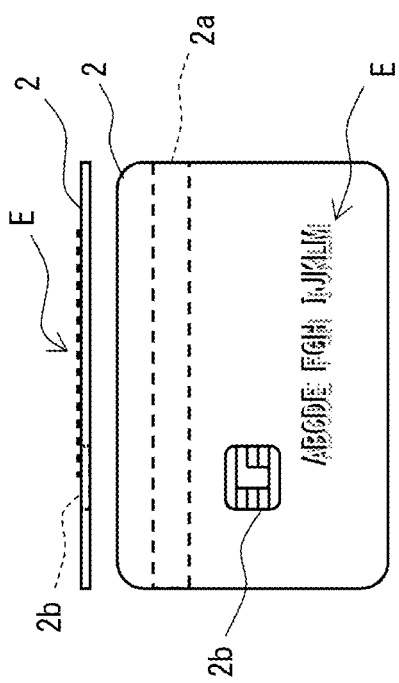
FIG. 1B
FIG. 1C

CARD READER AND CARD READER CONTROL METHOD

CROSS REFERENCE TO RELATED APPLICATION

The present application claims priority under 35 U.S.C. § 119 to Japanese Application No. 2018-167684 filed Sep. 7, 2018, the entire content of which is incorporated herein by reference.

FIELD OF THE INVENTION

At least an embodiment of the present invention particularly relates to a card reader provided with a magnetic head and an IC sensor, and a card reader control method.

BACKGROUND

Conventionally, when a card is inserted (introduced) into a card reader, it is necessary to prevent the front and back or the direction of the card from being incorrect.

As an example of such a technique, referring to Japanese Unexamined Patent Application Publication No. H11-203417, a technique that determines the authenticity and type of a card without introducing the entire card into the interior is described. In the technique of Japanese Unexamined Patent Application Publication No. H11-203417, when a magnetic card is introduced, the magnetic card is introduced into the interior if a predetermined reproduction signal is output by a magnetic head. On the other hand, introduction of the magnetic card is stopped if the predetermined reproduction signal is not output by the magnetic head.

Integrated circuit (IC) cards have become more widely adopted in the market in recent years, which has led to an increasing trend with respect to cards which are mounted with only an IC chip and do not include magnetic data.

However, in the technique described in Japanese Unexamined Patent Application Publication No. H11-203417, if a card which is mounted with only an IC chip and does not include a magnetic stripe is inserted, it is not possible to detect that the front and back or direction is incorrect.

Consequently, if the card is capable of being inserted even when the front and back or direction is incorrect, the card can sometimes become stuck, particularly at a rearmost position on a transport path. This is because the rearmost position on the transport path is narrowly formed for driving at the time of discharge of the card.

SUMMARY

At least an embodiment of the present invention has been made in view of such circumstances, provides a card reader and a card reader control method that solve the above problems by preventing a card from becoming stuck at a rearmost position on a transport path, even when the front and back and the like of the card is inserted incorrectly, while also enabling reading and writing of IC data from and to an IC chip when a card mounted with only an IC chip has been inserted in a normal state.

A card reader according to at least an embodiment of the present invention is provided with a magnetic head that reads magnetic data on a card, and an IC sensor that reads and writes IC data from and to an IC chip on the card, the card reader including: a magnetic data discrimination unit that determines the presence of the magnetic data on the card according to whether or not the magnetic data has been read by the magnetic head when the inserted card has been transported to a rear side from a leading end up to a predetermined position; and an IC reading controller that performs control to transport the card to a front side and cause the IC sensor to read the IC data on the IC chip if the magnetic data discrimination unit determines that the magnetic data is not present on the card.

As a result of such a configuration, a card can be prevented from becoming stuck at the rearmost position on the transport path, while also enabling IC data on the IC chip to be read.

The card reader according to at least an embodiment of the present invention further includes: a card slot into which the card is inserted; a transport path through which the card inserted into the card slot is transported; and a drive unit that transports the card to the rear side or the front side along the transport path, wherein the magnetic head reads and writes the magnetic data from and to the card when the card is transported on the transport path, and the IC sensor is disposed between the magnetic head and the card slot, and reads and writes the IC data from and to the IC chip on the card.

As a result of such a configuration, the presence of the magnetic data can be determined when magnetic data from the leading end up to a predetermined position on the card has been read.

The card reader according to at least an embodiment of the present invention further includes a front sensor that detects a trailing end of the card when the card has been transported to the rear side from the leading end up to the predetermined position.

As a result of such a configuration, the detection position for determining the presence of the magnetic data can be controlled.

The card reader according to at least an embodiment of the present invention further includes an IC position sensor that detects a position of the card for reading and writing the IC data from and to the IC chip on the card by means of the IC sensor.

As a result of such a configuration, the positions of the IC chip and the IC sensor can be accurately matched.

The card reader according to at least an embodiment of the present invention further includes a pre-head that is disposed in the vicinity of the card slot and detects the magnetic data on the card, wherein the magnetic data discrimination unit determines the presence of the magnetic data according to at least one of reading of the magnetic data by the magnetic head, and detection of the magnetic data by the pre-head.

As a result of such a configuration, the processing speed for acquiring magnetic data and the like can be increased.

In the card reader according to at least an embodiment of the present invention, the IC sensor is an IC contact block for a contact-type IC chip, or a non-contact type communication antenna for a non-contact type IC chip.

As a result of such a configuration, IC data on the IC chip can be read and written with certainty, while also enabling IC data on the IC chip to be read.

A card reader control method according to at least an embodiment of the present invention is executed by a card reader provided with a magnetic head that reads magnetic data on a card, and an IC sensor that reads and writes IC data from and to an IC chip on the card, the card reader control method including: determining the presence of the magnetic data according to whether or not the magnetic data has been read by the magnetic head when the inserted card has been transported to a rear side from a leading end up to a predetermined position; and performing control to transport the card to a front side and cause the IC sensor to read the IC data on the IC chip if the magnetic data is determined not to be present on the card.

As a result of such a configuration, a card can be prevented from becoming stuck at the rearmost position on the transport path.

According to at least an embodiment of the present invention, the presence of the magnetic data is determined according to whether or not the magnetic data is read when the inserted card has been transported to the rear side from the leading end up to the predetermined position, and a control to transport the card to the front side and cause the IC data to be read is performed if the magnetic data is determined not to be present. Therefore, it is possible to provide a card reader and a card reader control method which are capable of preventing a card from becoming stuck at a rearmost position on a transport path, while also enabling IC data on an IC chip to be read.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1A to FIG. 1C are diagrams relating to an embodiment of the present invention, wherein FIG. 1A is a schematic side view of a card reader, FIG. 1B is a side view of a card, and FIG. 1C is a plan view of a card;

DETAILED DESCRIPTION

Embodiment

Figure 2A:
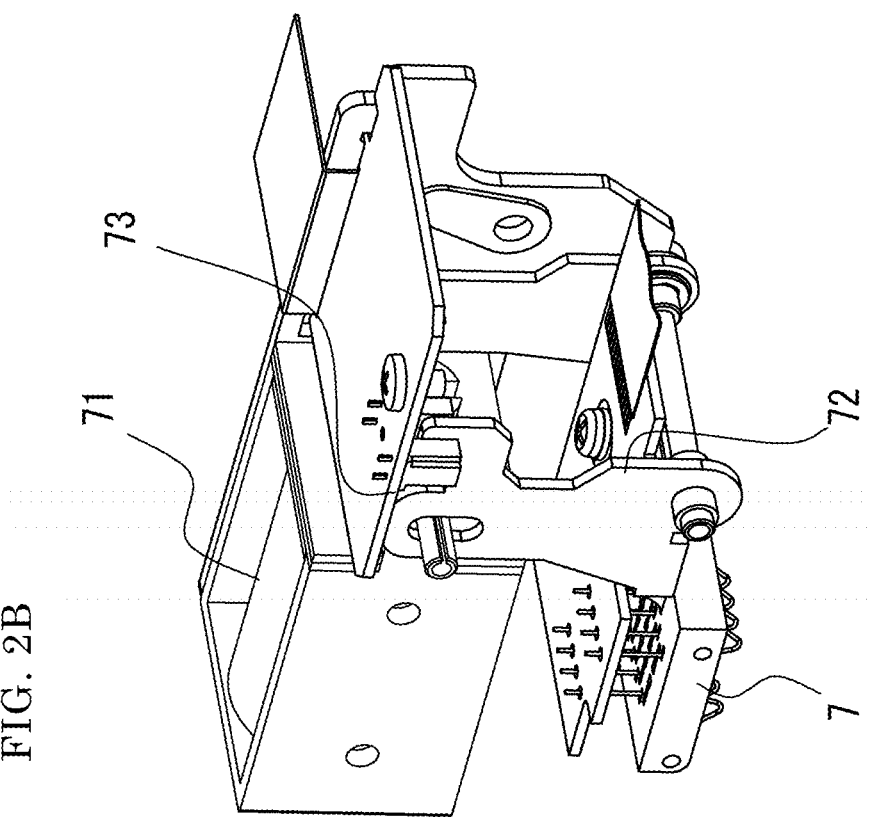
FIG. 2A and FIG. 2B are perspective views showing the external configuration of an IC sensor and the surrounding mechanisms shown in FIG. 1A to FIG. 1C.

Hereinafter, an embodiment of the present invention is described with reference to the drawings.
Schematic Configuration of Card Reader 1

First, the appearance of a card reader 1 and a card 2 according to the embodiment of the present invention will be described using FIG. 1A to FIG. 1C.

FIG. 1A shows the portion of the external configuration of the card reader 1 according to the embodiment of the present invention that relates to transport control of the card 2 of the present embodiment.

The card reader 1 is a motorized transport-type card reader/writer device capable of reading and writing information from and to the card 2. The card reader 1 is, for example, used by being installed to a host device 14 (FIG. 3) such as an ATM (Automated Teller Machine).

As shown in FIG. 1A, the present embodiment is described assuming that an X1 direction side represents the rear side in an insertion direction of the card 2. In contrast, an X2 direction side represents the discharge direction of the card 2, and the description assumes that the X2 direction side is the front side in the insertion direction of the card 2. That is to say, in the following, the X1 direction side is referred to as the "rear" side, and the X2 direction side is referred to as the "front" side. Further, in the present embodiment, a Y2 direction is referred to as the "upper" side, and a Y1 direction is referred to as the "lower" side. In addition, when the card 2 is inserted from a card slot 3 into a transport path 4, the X1 direction end (rear side end) of the card 2 is referred to as a leading end, and the X2 direction end (front side end) is referred to as a trailing end.

FIG. 1B and FIG. 1C illustrate the appearance of the card 2. The card 2 is, for example, a card made of vinyl chloride having a thickness of 0.7 to 0.8 mm.

As shown in FIG. 1B and FIG. 1C, an IC chip 2b is built into a front surface of the card 2 which, for example, is formed having a terminal unit formed of eight external connection terminals. That is to say, in the present embodiment, an example will be described where the IC chip 2b of the card 2 is a contact-type IC chip. Data can be read and/or written from and to the IC chip 2b by bringing the terminal unit of the IC chip 2b into contact with an IC contact of an IC sensor 7 of the card reader 1 described below.

On the other hand, a back surface of the card 2 is sometimes formed a magnetic stripe 2a that records magnetic data. In addition, embossing E which represents an imprint of various characters can sometimes be formed and processed on the surface of the card. The height of the convex portion of the embossing E is approximately 0.2 to 0.5 mm.

Here, in the present embodiment, a description will be given for examples where the card 2 represents a card provided with only an IC chip and does not include a magnetic stripe 2a (hereinafter referred to as an "IC card"), a card not provided with an IC chip which only includes a magnetic stripe 2a (hereinafter referred to as a "magnetic card"), and a card provided with the functions of both a magnetic card and an IC card (hereinafter referred to as an "IC magnetic card").

Further, in terms of the front and back of the card 2 of the present embodiment, a description will be given where the surface on which the terminal unit of the IC chip is formed and on which the embossing E becomes a convex portion is referred to as the "front", and the surface on which a magnetic stripe 2a may be formed is referred to as the "back".

The card 2 may also be a PET (polyethylene terephthalate) card or a paper card having a thickness of approximately 0.18 to 0.36 mm.

More specifically, as an external configuration, the card reader 1 includes a card slot 3, a transport path 4, a magnetic head 6, an IC sensor 7, a front sensor 8, a rear sensor 9, an IC position sensor 10, and a drive unit 5.

The card slot 3 is a slot formed for inserting the card 2, and has a slit shape. The card slot 3 is configured by a member having a shape which is tapered toward the inside so that the card 2 can be easily inserted into the transport path 4 inside the card reader 1.

In addition, although not shown, a shutter and a card detection switch are provided in the vicinity of the card slot 3.

The shutter is a mechanism that drives a shutter member or the like for preventing external dust and foreign matter from entering. The shutter moves the shutter member between a closed position which blocks the transport path 4 and an open position which opens the transport path 4 by means of the motive force of a solenoid (not shown).

The card detection switch is a mechanical switch or the like which detects that the card 2 has been inserted into the card slot 3.

The transport path 4 is formed connected to the card slot 3, and linearly transports the inserted card 2. In the present embodiment, the rear end of the transport path 4 is formed with a particularly narrow vertical width. This enables the card 2 to be transported and discharged from the rear side to the front side with certainty.

That is to say, in the card reader 1 according to the present embodiment, the transport path 4 is formed assuming that the card 2 will be inserted in the correct direction. Consequently, if the front and back or orientation of the card 2 is reversed at the time of insertion, the embossing E can cause the card to jam by becoming stuck at the rear side of the transport path 4, which can result in a malfunction that prevents normal transport or discharge.

The drive unit 5 is a transport mechanism that transports the card 2 to the rear side or the front side along the transport path 4. The drive unit 5, for example, rotates a drive roller and a pulley and the like connected to a motor according to control by a controller 11 (FIG. 3), and by means of the motive force of the motor (not shown). As a result, the card 2 is transported between opposingly disposed pad rollers while being biased toward the drive roller.

The magnetic head 6 reads or writes information stored in the magnetic stripe 2a of the card 2. In the present embodiment, the magnetic head 6 is disposed below the midpoint of the transport path 4. Consequently, the magnetic head 6 reads and reproduces the magnetic data written to the magnetic stripe 2a of the card 2, which represents recorded information, as a magnetic signal.

The magnetic head 6 reads the magnetic signal of the tracks of the magnetic stripe 2a as a result of a sliding motion of the magnetic stripe 2a when the card 2 is inserted from the card slot 3 and transported inside the transport path 4 from the front to the rear side. The magnetic signal of the magnetic stripe 2a of the card 2 read by the magnetic head 6 is output as an analog signal which is successively output to the controller 11 by a demodulation electronic component (demodulation IC) as magnetic data after being amplified by an amplifier (not shown) and the like. Of course, no magnetic data is output at this time in the case of an IC card because it does not include a magnetic stripe 2a. Consequently, the processing described below is performed.

Further, if the card 2 is a magnetic card or an IC magnetic card, the magnetic head 6 also reads the magnetic signal of the tracks of the magnetic stripe 2a as a result of a sliding motion of the magnetic stripe 2a when the card is discharged by being transported from the rear side to the front side inside the transport path 4.

The IC sensor 7 is a sensor for reading and writing IC data stored on an IC chip on an IC card or IC magnetic card. In the present embodiment, a description will be given for an example where the IC sensor 7 is configured by an IC contact block for a contact-type IC chip. In this example, a front side end of the IC sensor 7 is pivotably mounted on the front end side of the card reader 1 above the transport path 4, and is capable of a vertical motion. The configuration of the surroundings of the IC sensor 7 will be described later.

The front sensor 8, the rear sensor 9, and the IC position sensor 10 are sensors that detect the position of the card 2 while being transported inside the card reader 1. These sensors that detect the position are, for example, optical-type sensors formed of a light-emitting element (photodiode) and a light-receiving element (photosensor). As a result of disposing a plurality of such sensors at different positions inside the transport path 4, the positions of the card 2 on the card transport path 4 can be detected.

Specifically, the front sensor 8 detects that the card 2 has been inserted and has started being transported to the rear side of the transport path 4. Consequently, the front sensor 8 is disposed so as to detect the card 2 at the front side of the transport path 4. Further, in the present embodiment, the front sensor 8 is capable of detecting the trailing end of the card 2 when the card 2 is transported to the rear side from the leading end up to a predetermined position.

The rear sensor 9 detects the leading end of the card 2 when the card 2 is transported to the rear side. Consequently, the rear sensor 9 is disposed so as to detect the card 2 at the rear side of the transport path 4. In the present embodiment, the rear sensor 9 detects that the leading end portion of the card 2 has reached a position in which magnetic data can be reacquired from the opposite direction. This position represents the rearmost position on the transport path 4. This position may be made a reference point when transporting the card 2 to a position for reading and writing by means of the IC sensor 7.

The IC position sensor 10 detects a position for reading and writing IC data from and to the IC chip on the card 2 by means of the IC sensor 7. In the present embodiment, this position serves as a contact position at which the IC sensor 7 makes contact with the terminal unit of the IC chip on the card 2. Consequently, the IC position sensor 10 is disposed so as to detect the card 2 when it is between the front sensor 8 and the rear sensor 9 on the transport path 4. In the present embodiment, the IC position sensor 10 detects that the leading end portion of the card 2 has reached a position corresponding to the contact position when the card 2 is transported from the rear side to the front side.

Here, a specific example of the configuration of the IC sensor 7 will be described using FIG. 2A and FIG. 2B.

In the example of the present embodiment, because the IC sensor 7 is capable of a vertical motion as described above, it includes a solenoid 71, a shield plate 72, and a vertical sensor 73 as surrounding members.

The solenoid 71 converts supplied electrical power into an electromagnetic force to drive a plunger to the rear side and the front side, and this motion delivered to the shield plate 72. The shield plate 72 converts the motion of the plunger of the solenoid 71 into a vertical motion of the IC sensor 7. Further, the shield plate 72 does not shield the vertical sensor 73 from light when the IC sensor 7 is in a raised position, and shields the vertical sensor 73 from light when the IC sensor 7 is in a lowered position. The vertical sensor 73 is an optical sensor formed of a photodiode emitting light, a light-receiving element and the like, and detects the vertical position of the IC sensor 7 according to whether or not light is being shielded by the shield plate 72.

FIG. 2A shows a state where the IC sensor 7 is raised. In this case, no contact is made with the terminal unit of the IC chip on the card 2 inside the transport path 4. That is to say, in this state, reading and writing of IC data cannot be performed.

Figure 2B:
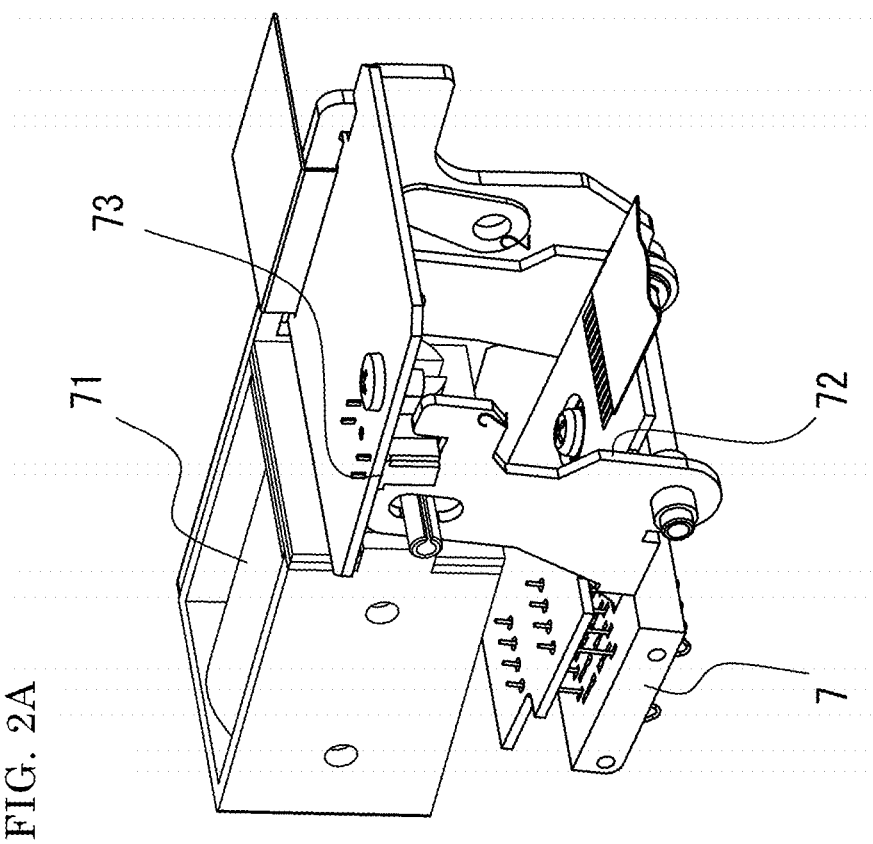

FIG. 2B shows a state where the IC sensor 7 is lowered. In this case, because a wire-form IC contact makes contact with the terminal unit of the IC chip on the card 2, reading and writing of IC data is possible if the card 2 is an IC card or an IC magnetic card.

Figure 3:
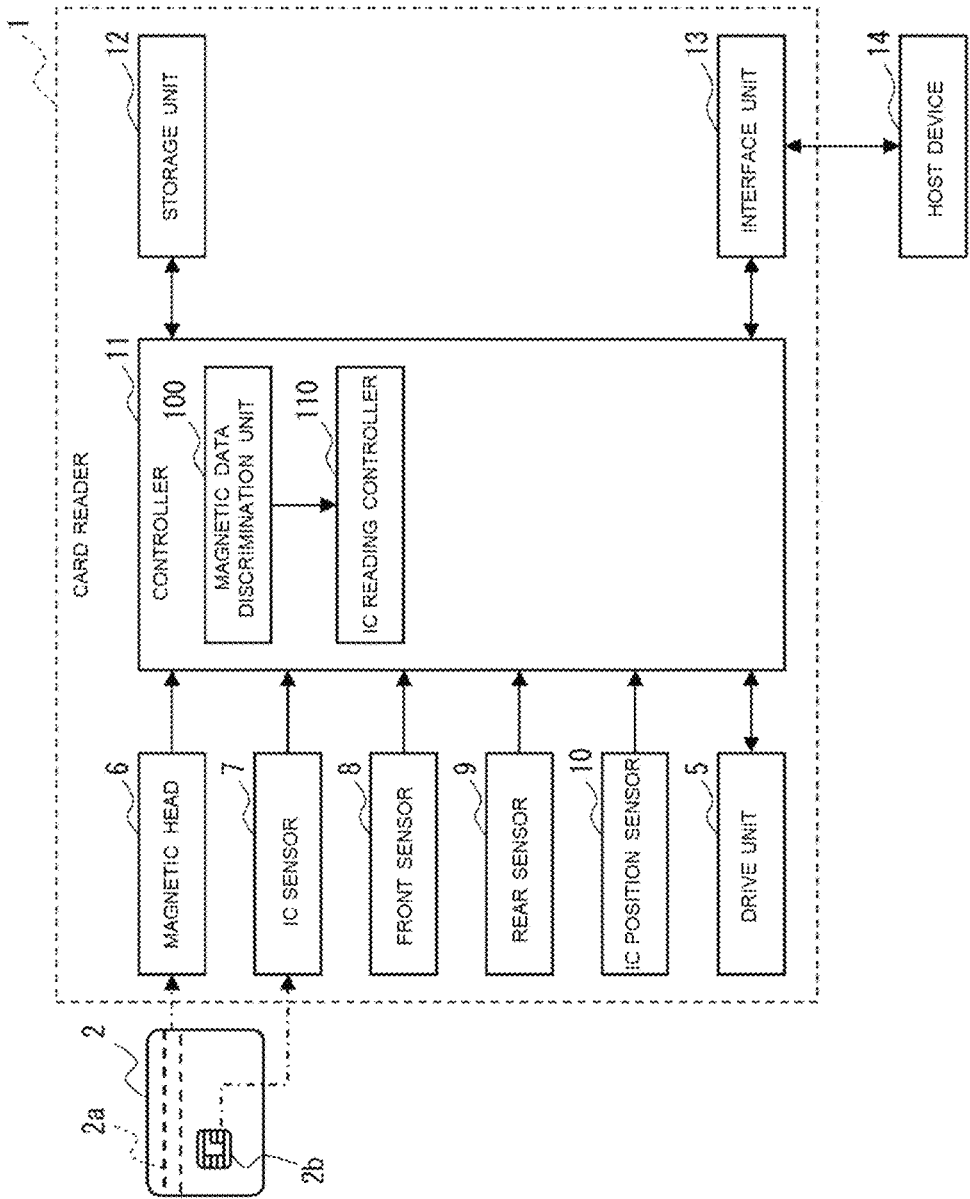
FIG. 3 is a block diagram showing a control configuration of the card reader according to the embodiment of the present invention.

Next, a control configuration of the card reader 1 will be described using FIG. 3.

The card reader 1 includes, as a control configuration, a controller 11, a storage unit 12, and an interface unit 13 in addition to the drive unit 5, the magnetic head 6, the IC sensor 7, the front sensor 8, the rear sensor 9, and the IC position sensor 10 described above. All of the parts are connected to the controller 11 by a dedicated bus, a connection line, or the like.

The controller 11 is constituted by a control calculation means such as a CPU (Central Processing Unit) that controls all of the parts of the card reader 1, and a peripheral circuit and the like that controls all of the parts. Specifically, the controller 11 integrally controls all of the parts, and controls the reading and writing of magnetic data and IC data. The controller 11 is capable of processing and decrypting magnetic data from the magnetic head 6. In addition, the controller 11 is also capable of reading and writing IC data by means of the IC sensor 7. Consequently, the controller 11 acquires signals from the front sensor 8, the rear sensor 9, and the IC position sensor 10, and controls the driving of the card 2 by means of the drive unit 5.

Further, the controller 11 reads and writes data from and to the card 2, and is also capable of communicating with the host device 14 such as an ATM via the interface unit 13.

The storage unit 12 is a non-temporary recording medium which includes a ROM (Read Only Memory) that stores various programs and data including a control program executed by the controller 11, a RAM (Random Access Memory) that serves as a working area of the controller 11, and the like. Among these, the ROM may also be an EEPROM or a flash memory.

The interface unit 13 is an interface that performs various communications with the host device 14. The interface unit 13, for example, includes a USB (Universal Serial Bus) or RS-232C interface.

Next, the functional configuration of the controller 11 will be described.

The controller 11 includes a magnetic data discrimination unit 100 and an IC reading controller 110 as functional blocks.

The magnetic data discrimination unit 100 determines whether or not magnetic data has been read by the magnetic head 6 when the card 2 inserted from the card slot 3 has been transported to the rear side from the leading end up to a predetermined position on the transport path 4. As a result, the magnetic data discrimination unit 100 determines the presence of magnetic data on the card 2.

The IC reading controller 110 transports the card 2 to the front side if the magnetic data discrimination unit 100 determines that the magnetic data is not present on the card 2. At this time, the IC reading controller 110 performs control to cause the IC sensor 7 to read IC data on the IC chip.

Here, the controller 11 is capable of functioning as the magnetic data discrimination unit 100 and the IC reading controller 110 by executing the control program stored on the ROM of the storage unit 12. In addition, all or part of the magnetic data discrimination unit 100 and the IC reading controller 110 may be configured as a circuit by means of an FPGA (Field-Programmable Gate Array) or the like. The controller 11 and the storage unit 12 may be integrally configured in the manner of a microcomputer with a built-in memory.

Card Transport Control Processing

Next, the card transport control processing performed by the card reader 1 according to the embodiment of the present invention will be described using FIG. 4 and FIG. 5A to FIG. 5D.

Figure 4:
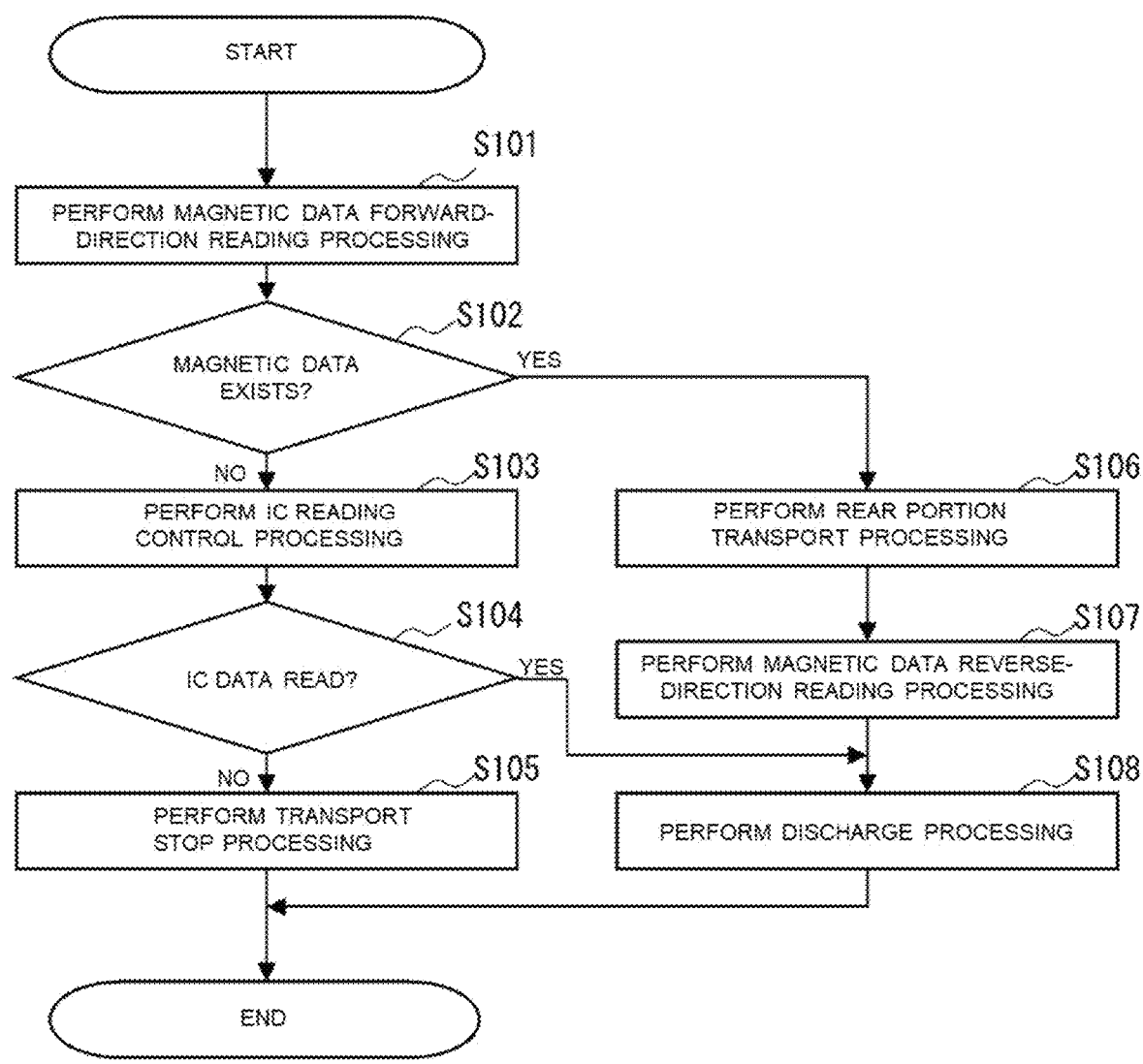
FIG. 4 is a flowchart of card transport control processing according to the embodiment of the present invention.

The card transport control processing in FIG. 4 illustrates the processing for the control method of the card reader 1 of the present embodiment. In this processing, when the inserted card 2 has been transported to the rear side from the leading end up to a predetermined position, the presence of magnetic data is determined according to whether or not magnetic data has been read by the magnetic head 6. Then, control to transport the card to the front side and cause the IC sensor 7 to read IC data on the IC chip is performed if it is determined that the magnetic data is not present on the card 2.

In the card transport control processing according to the present embodiment, the controller 11 primarily executes the control program stored in the storage unit 12 in a cooperative fashion with all of the parts while using hardware resources.

In the following, each step of the card transport control processing according to the present embodiment will be described in detail using the flowchart in FIG. 4, which illustrates an example of the control flow in the card reader 1.

Step S101

First, the magnetic data discrimination unit 100 performs magnetic data forward-direction reading processing.

Figure 5A:
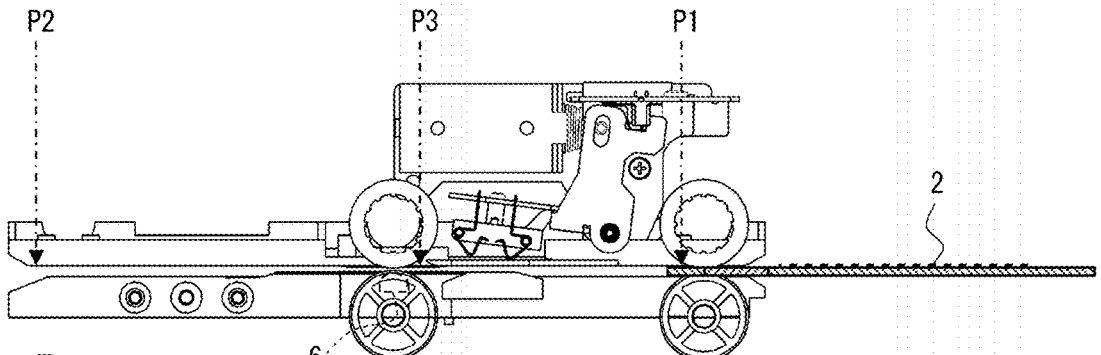
FIG. 5A to FIG. 5D are conceptual diagrams showing the relationship between transport of the card according to the card transport control processing shown in FIG. 4 and each of the sensors.

According to the example in FIG. 5A, the magnetic data discrimination unit 100 opens the shutter when insertion of the card is detected at the card detection switch, and the card 2 is introduced into the card reader 1 as a result of a motor being driven by the drive unit 5. Then, the leading end of the card 2 reaches a position P1, which corresponds to a detection position of the front sensor 8. When the magnetic data discrimination unit 100 acquires a signal from the front sensor 8, it starts magnetic data reading processing, and controls the drive unit 5 to transport the card 2 from the front side to the rear side (forward direction) at a specified speed.

Here, in the present embodiment, in those cases where the card 2 is a magnetic card or an IC magnetic card and has been inserted in the correct direction, the magnetic stripe 2a slides to the magnetic head 6 such that the magnetic signal is read. The magnetic signal is output to the controller 11 as magnetic data.

Step S102

Next, the magnetic data discrimination unit 100 determines the presence of magnetic data on the card 2.

Here, in order to read all of the magnetic data on the card 2, the entire card must pass over the magnetic head 6.

In contrast, in the present embodiment, the magnetic data discrimination unit 100 determines whether or not magnetic data has been read by the magnetic head 6 when the card 2 inserted from the card slot 3 has been transported to the rear side from the front end up to a predetermined position on the transport path 4. That is to say, the magnetic data discrimination unit 100 determines the presence of magnetic data while the card 2 is passing over the magnetic head 6. In other words, this determination is made without reading all of the magnetic data.

Figure 5B:
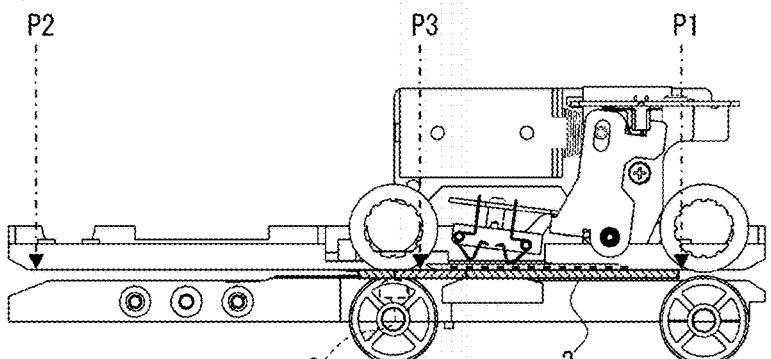

FIG. 5B shows a state of the card 2 inside the transport path 4 at this time. In this example, the trailing end portion of the card 2 is transported to the rear side of the position P1, and the card 2 is no longer detected by the front sensor 8. That is to say, this position represents the "predetermined position". An example of the predetermined position is a position in which the magnetic head 6 has moved to a position approximately 25 mm from the leading end of the card 2. However, the predetermined position is not limited to such a position approximately 25 mm from the leading end, and can be appropriately set. When this state is recognized, the magnetic data discrimination unit 100 determines the presence of magnetic data on the card 2. Specifically, if a data amount of magnetic data of at least a specific value has been read, the magnetic data discrimination unit 100 determines that magnetic data exists on the card 2, that is to say, determines "Yes". Otherwise, the magnetic data discrimination unit 100 determines that the magnetic data is not present on the card 2, that is to say, determines "No".

If the determination is "Yes", the magnetic data discrimination unit 100 advances the processing to step S106.

If the determination is "No", the magnetic data discrimination unit 100 advances the processing to step S103.

Step S103

If it is determined that the magnetic data is not present on the card 2, the IC reading controller 110 performs IC reading control processing.

Here, in the case of an IC card where the card 2 does not include a magnetic stripe 2*a*, magnetic data is no longer read at all. Consequently, the IC reading controller 110 temporarily assumes that an IC card has been inserted in the correct direction, and causes the IC sensor 7 to read IC data on the IC chip. Therefore, the card 2 is transported from the rear side to the front side up to the contact position.

Figure 5C:
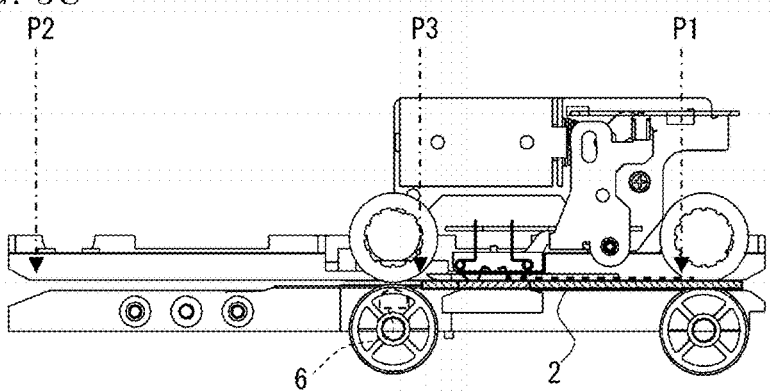

FIG. 5C shows the card 2 in a state where IC data is being read. In this example, the IC reading controller 110 controls the drive unit 5 to transport the card 2 from the rear side to the front side up to a position P3 that corresponds to a detection position of the IC position sensor 10. The IC reading controller 110 downwardly drives the IC sensor 7 in this state. As a result, if the card 2 is an IC card or an IC magnetic card, the terminal unit of the IC chip and the IC contact on the IC sensor 7 make contact such that IC data can be read and/or written.

Step S104

Next, the IC reading controller 110 determines whether or not IC data has been successfully read.

The IC reading controller 110 checks whether or not the terminal unit of the IC chip and the IC contact on the IC sensor 7 are in contact, and performs communication with the IC chip. At this time, the IC reading controller 110 attempts to read IC data. As a result, if IC data is successfully read, the IC reading controller 110 determines "Yes". In all other cases, that is to say, if IC data is not successfully read, the IC reading controller 110 determines "No".

If the determination is "Yes", the IC reading controller 110 raises the IC sensor 7 after completion of reading and/or writing of IC data, such that the terminal unit of the IC chip and the IC contact are separated. Then, the IC reading controller 110 advances the processing to step S108.

If the determination is "No", the IC reading controller 110 advances the processing to step S105.

Step S105

If IC data could not be read successfully, the IC reading controller 110 performs transport stop processing.

The IC reading controller 110 stops transport of the card 2, and notifies the host device 14 that an abnormality occurred. Thereafter, the IC reading controller 110 waits with the card 2 held inside the transport path 4 according to an instruction from the host device 14, and allows a serviceperson to resolve the issue. Alternatively, the IC reading controller 110 may also discharge the card 2 from the card slot 3 according to an instruction from the host device 14. Further, processing may be performed that introduces the card 2 to the rear side of the card reader 1.

Here, even when the card 2 is a magnetic card or an IC magnetic card, magnetic data is no longer read at all in step S101 described above if the front and back or orientation of the card 2 is incorrect at the time of insertion. However, in this case, IC data also cannot be read when the IC sensor 7 is downwardly driven. Consequently, the IC reading controller 110 is capable of recognizing that the front and back or orientation of the insertion of the card 2 is incorrect, or that an abnormal card is present, without transporting the card 2 to the rearmost position on the transport path 4. As a result, it is possible to prevent cards 2 having an embossing E from becoming caught at the rearmost position on the transport path 4.

Thereafter, the IC reading controller 110 ends card transport control processing.

Step S106

If it is determined that magnetic data exists on the card 2, the magnetic data discrimination unit 100 performs rear portion transport processing.

The magnetic data discrimination unit 100 transports the magnetic card or magnetic IC card, which has been determined to have magnetic data, up to the rear side on the transport path 4 where it is temporarily stopped.

Figure 5D:
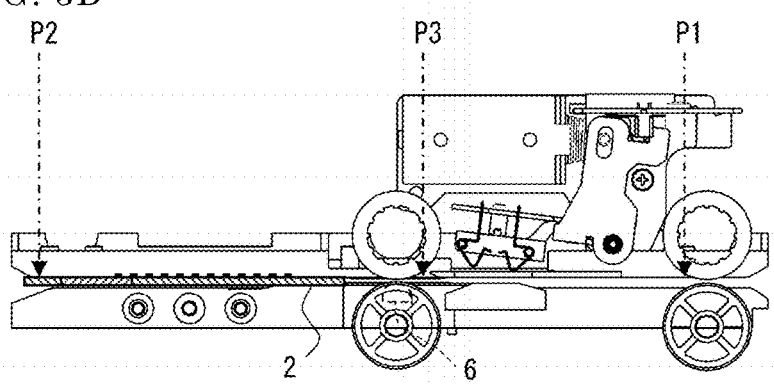

FIG. 5D shows the card 2 in this state. Here, if the leading end of the card 2 is detected at a position P2 corresponding to a detection position of the rear sensor 9, the magnetic data discrimination unit 100 determines that the card 2 has been transported up to the rearmost side on the transport path 4 and controls the drive unit 5 to stop the card 2.

Step S107

Next, the magnetic data discrimination unit 100 performs magnetic data reverse-direction reading processing.

The magnetic data discrimination unit 100 controls the drive unit 5 and transports the card 2 from the rear side to the front side. As a result, the magnetic stripe 2*a* slides to the magnetic head 6 again such that magnetic information is read as magnetic data in a reverse direction and output to the controller 11. The controller 11 aligns the forward-direction magnetic data with the reverse-direction magnetic data, and ultimately generates magnetic data and performs decoding and the like, followed by storage in the storage unit 12 or outputs to the host device 14.

Step S108

Here, the magnetic data discrimination unit 100 performs discharge processing.

The magnetic data discrimination unit 100 controls the drive unit 5 and transports the card 2 from the rear side to the front side. As a result, the card 2 is discharged from the card slot 3. As described above, an IC card that does not include a magnetic stripe 2*a* is discharged without being transported to the rearmost position on the transport path 4.

This completes the card transport control processing according to the embodiment of the present invention.

Main Effects of Present Embodiment

The following effects can be obtained as a result the above configuration.

Conventionally, in motorized-type card readers, magnetic detection is performed at a pre-head that detects a magnetic stripe when a card is inserted into the card reader, and the card is inserted in the correct direction by opening a shutter if magnetism is detected.

In this regard, IC cards have become more widely adopted in the market in recent years, which has led to an increasing trend with respect to cards mounted with only an IC chip that do not include magnetic data. In order to enable such cards to be introduced into a card reader, it is necessary to introduce the card without performing magnetic detection at a pre-head. In this case, because the card can be inserted in an incorrect direction, cards having an embossing can sometimes be inserted in a reverse orientation.

However, in conventional card readers, it is determined whether magnetic data has been correctly read, or whether magnetic data is present, after the entire card has passed over the magnetic head 6. If the entire card passes over the magnetic head 6, the card is transported further to the rear than the magnetic head 6. Here, the transport path 4 of the card reader is designed under the assumption that the card will be inserted in the correct direction. Therefore, if a card having an embossing is inserted in reverse, it can become caught at the rearmost position on the transport path 4, causing the card to jam (become stuck) and result in a malfunction that prevents normal transport or discharge.

In this regard, the technique in Japanese Unexamined Patent Application Publication No. H11-203417 is unable to even detect whether the front and back or orientation of the insertion is correct for cards other than magnetic cards.

In contrast, the card reader 1 according to the embodiment of the present invention is provided with a magnetic head 6 that reads magnetic data on a card 2, and an IC sensor 7 that reads and writes IC data from and to an IC chip on the card 2, the card reader 1 including: a magnetic data discrimination unit 100 that determines the presence of magnetic data on the card 2 according to whether or not magnetic data has been read by the magnetic head 6 when the inserted card 2 has been transported to a rear side from a leading end up to a predetermined position; and an IC reading controller 110 that performs control to transport the card 2 to a front side and cause the IC sensor 7 to read the IC data on the IC chip if the magnetic data discrimination unit 100 determines that the magnetic data is not present on the card 2.

As a result of such a configuration, the card 2 is no longer transported to the rear of the predetermined position except in those cases where a card 2 including magnetic data is inserted such that the front and back and orientation are correct. That is to say, for example, when a card 2 having an embossing E is inserted such that the front and back or direction is incorrect, magnetic data is not read by the magnetic head 6 even if the card 2 includes a magnetic stripe 2*a*. Consequently, a card 2 that does not include magnetic data is prevented from being transported to the rear side on the transport path 4 in consideration of the possibility of the front and back or orientation is incorrect. As a result, it is possible to prevent a card 2 having an embossing E from becoming stuck at the rearmost position on the transport path 4 when inserted such that the front and back or orientation is reversed.

In addition, in cards 2 that do not include magnetic data but include an IC chip, IC data can be read and written thereafter by means of the IC sensor 7. Further, even in a case where the card 2 is an IC magnetic card but has a damaged magnetic stripe 2*a* or magnetic signal, it is possible for IC data to be read or written from and to the IC chip. That is to say, it is possible to prevent all cards 2 that do not include magnetic data from being discharged from the card reader 1, which enables service to be improved.

Further, cards 2 that do not include magnetic data but include an IC chip no longer need to be transported to the rear of the card reader 1 in order to discriminate the presence of magnetic data. Consequently, the processing speed of reading and writing IC data from and to the card 2 and the like can be improved.

Furthermore, the card reader 1 according to the embodiment of the present invention further includes: a card slot 3 into which the card is inserted 2; a transport path 4 through which the card 2 inserted into the card slot 3 is transported; and a drive unit 5 that transports the card 2 to the rear side or the front side along the transport path 4; wherein the magnetic head 6 reads and writes magnetic data from and to the card 2 when the card 2 is transported on the transport path 4, and the IC sensor 7 is disposed between the magnetic head 6 and the slot, and reads and writes IC data from and to the IC chip on the card 2.

As a result of such a configuration, the presence of magnetic data can be determined while transporting the card 2 to the rear side at the point where, of the magnetic data on the card 2, the magnetic data from the leading end to the predetermined position on the card 2 has been read by the magnetic head 6. Further, it becomes possible to perform control to transport the card 2 to the front side and cause the IC sensor 7 to read information from the IC chip if it is determined that the magnetic data is not present.

Moreover, the card reader 1 according to the embodiment of the present invention further includes a front sensor 8 that detects a trailing end of the card 2 when the card 2 has been transported to a rear side from a leading end up to a predetermined position.

As a result of such a configuration, the detection position for determining the presence of magnetic data can be controlled. That is to say, when the trailing end of the card 2, which is the front side end, is detected by the front sensor 8, the leading end of the card 2, which is the rear side end, has not reached the rearmost position where the card 2 can easily become stuck. As a result of easily detecting such a position, the card 2 can be prevented from becoming stuck.

Furthermore, the card reader 1 according to the embodiment of the present invention further includes an IC position sensor 10 that detects a position of the card 2 for reading and writing IC data from and to the IC chip on the card 2 by means of the IC sensor 7.

As a result of such a configuration, the positions of the IC chip and the IC sensor 7 can be accurately matched. That is to say, after determining that the magnetic data is not present, the IC position sensor 10 is capable of detecting the leading end of the card 2, which is the rear side end, when the card 2 is transported from the rear side to the front side. As a result, if the card 2 is an IC card not including a magnetic stripe 2*a* and the front and back and orientation are correct at the time of insertion, the terminal unit of the IC chip and the IC contact on the IC sensor 7 are capable of making contact with certainty.

Moreover, in the card reader 1 according to the embodiment of the present invention, the IC sensor 7 is an IC contact block for a contact-type IC chip.

As a result of such a configuration, IC data on a contact-type IC chip provided on an IC card or an IC magnetic card can be read and written with certainty.

Other Embodiments

The card reader 1 in the embodiment above was described in terms of a configuration not including a pre-head. A pre-head is a magnetic head used only for detecting that a card including a magnetic stripe has been inserted into the card reader.

However, a card reader according to another embodiment of the present invention may be configured to further include a pre-head disposed in the vicinity of the card slot 3 which detects the magnetic data on the card 2, wherein the magnetic data discrimination unit 100 determines the presence of the magnetic data according to reading of the magnetic data by the magnetic head 6 and/or detection of the magnetic data by the pre-head.

As a result of such a configuration, for example, if a pre-head capable of detecting a three-track of ISO/IEC or one-track of JIS2 is installed, the presence of magnetic data on the card can be determined according to whether or not magnetism is detected at the pre-head, rather than at the magnetic head 6 inside the card reader. That is to say, by detecting a magnetic card or an IC magnetic card including magnetic data at the pre-head, it can be rapidly determined whether the card 2 is one that may be transported to the rearmost position. Therefore, the processing speed for acquiring magnetic data and the like can be increased.

In addition, when the presence of magnetic data is determined by the magnetic head 6 inside the card reader in the manner of the above embodiment, the discrimination is made according to the magnetic data on the leading end side of the card.

In contrast, the pre-head may also determine the presence of magnetic data on the trailing end side of the card 2. As a result, even if the magnetic data on the leading end side of the card 2 is demagnetized or the card has no magnetic data on a preamble section, the presence of magnetic data can be correctly determined.

Further, in the case of a configuration provided with a pre-head, a configuration is possible where, if magnetic data is not detected at the pre-head, the card 2 is transported from the front side to the rear side when the card 2 is inserted, and for the transport to be temporarily stopped upon detection that the leading end of the card 2, which is the rear side end, has reached the position of the IC position sensor 10.

In this case, after the card 2 is transported to a position where the trailing end reaches the front sensor 8 in the manner of the above embodiment, there is no need to return to the detection position of the IC position sensor 10 and it is possible to determine whether or not IC data can be read by means of the IC sensor 7. Therefore, a card 2 which is not a processing target can be rapidly prevented from being transported into the card reader 1.

In addition, a configuration is possible in which the presence of magnetic data is determined by detecting magnetic data at the pre-head, and further, reading magnetic data by means of the magnetic head 6.

Further, in the embodiment above, the IC sensor 7 was described in terms of an example using an IC contact block for a contact-type IC chip.

However, a configuration is possible in which a non-contact type communication antenna for a non-contact type IC chip is used as the IC sensor 7.

As a result of such a configuration, it becomes possible to read and write IC data with certainty from and to a non-contact type IC chip such as an RF (Radio Frequency) ID by means of a non-contact type communication antenna such as an electromagnetic induction antenna. If accurate position matching is not required in such a non-contact type communication antenna, the IC position sensor 10 can be omitted to enable a configuration in which costs are reduced. Further, by constantly reading IC data on the non-contact type IC chip during transport of the card 2, it becomes possible to rapidly discriminate whether the card 2 is an IC card. If the card 2 is an IC card, it can be discharged without being transported to the rearmost position and acquiring magnetic data by means of the magnetic head 6.

In addition, in order to recognize the position of the card 2 inside the transport path 4 in detail, position sensors other than the front sensor 8, the rear sensor 9, and the IC position sensor 10 may be provided. These position sensors, for example, may include optical sensors and the like for detecting that the card 2 is making contact with the magnetic head 6 inside the transport path 4.

The configurations and operations in the embodiment above are examples. Needless to say, changes may be made as appropriate within a scope not departing from the spirit of at least an embodiment of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card having an integrated circuit (IC) chip, the card reader comprising:
   a magnetic head configured to read magnetic data on the card;
   an IC sensor configured to read and write IC data from and to the IC chip on the card;
   a magnetic data discrimination unit configured to determine the presence of the magnetic data on the card according to whether or not the magnetic data has been read by the magnetic head when the inserted card has been transported to a rear side from a leading end up to a predetermined position;
   an IC reading controller configured to, if the magnetic data discrimination unit determines that the magnetic data is not present on the card, perform control to transport the card to a front side and control the IC sensor to read the IC data on the IC chip;
   a card slot into which the card is inserted;
   a transport path through which the card inserted into the card slot is transported;
   a drive unit configured to transport the card to the rear side or the front side along the transport path; and
   a pre-head disposed in a vicinity of the card slot and configured to detect the magnetic data on the card,
   wherein
   the IC sensor is disposed between the magnetic head and the card slot;
   the magnetic head is configured to read and write the magnetic data from and to the card when the card is transported on the transport path, and
   the magnetic data discrimination unit configured to determine the presence of the magnetic data according to at least one of reading of the magnetic data by the magnetic head, and detection of the magnetic data by the pre-head.

2. The card reader according to claim 1, further comprising
   a front sensor configured to detect a trailing end of the card when the card has been transported to the rear side from the leading end up to the predetermined position.

3. The card reader according to claim 2, further comprising
   an IC position sensor configured to detect a position of the card for reading and writing the IC data from and to the IC chip on the card by means of the IC sensor.

4. The card reader according to claim 1, further comprising:
   an IC position sensor configured to detect a position of the card for reading and writing the IC data from and to the IC chip on the card by means of the IC sensor.

5. The card reader according to claim 1, wherein
the IC sensor comprises an IC contact block for a contact-type IC chip, or a non-contact type communication antenna for a non-contact type IC chip.

6. The card reader according to claim 1, further comprising
a front sensor configured to detect a trailing end of the card when the card has been transported to the rear side from the leading end up to the predetermined position.

7. The card reader according to claim 6, further comprising
an IC position sensor configured to detect a position of the card for reading and writing the IC data from and to the IC chip on the card by means of the IC sensor.

8. The card reader according to claim 7, further comprising
a pre-head disposed in a vicinity of the card slot and configured to detect the magnetic data on the card, wherein
the magnetic data discrimination unit is configured to determine the presence of the magnetic data according to at least one of reading of the magnetic data by the magnetic head, and detection of the magnetic data by the pre-head.

9. The card reader according to claim 8, wherein
the IC sensor comprises an IC contact block for a contact-type IC chip, or a non-contact type communication antenna for a non-contact type IC chip.

10. The card reader according to claim 6, further comprising
a pre-head disposed in a vicinity of the card slot and configured to detect the magnetic data on the card, wherein
the magnetic data discrimination unit is configured to determine the presence of the magnetic data according to at least one of reading of the magnetic data by the magnetic head, and detection of the magnetic data by the pre-head.

11. The card reader according to claim 1, further comprising
an IC position sensor configured to detect a position of the card for reading and writing the IC data from and to the IC chip on the card by means of the IC sensor.

12. The card reader according to claim 11, further comprising
a pre-head disposed in a vicinity of the card slot and configured to detect the magnetic data on the card, wherein
the magnetic data discrimination unit configured to determine the presence of the magnetic data according to at least one of reading of the magnetic data by the magnetic head, and detection of the magnetic data by the pre-head.

* * * * *